United States Patent [19]

Ezell

[11] 3,756,036

[45] Sept. 4, 1973

[54] DEMETHANIZING METHOD AND APPARATUS

[75] Inventor: Emory L. Ezell, Sweeny, Tex.

[73] Assignee: Philips Petroleum Company, Bartlesville, Okla.

[22] Filed: Apr. 20, 1971

[21] Appl. No.: 135,637

[52] U.S. Cl. .............................. 62/28, 62/21, 62/41, 62/20

[51] Int. Cl. ........... F25j 3/02, F25j 3/06, F25j 3/00

[58] Field of Search ..................... 62/17, 20, 23, 24, 62/27, 28, 21, 41; 203/77

[56] References Cited

UNITED STATES PATENTS

| | | | |
|---|---|---|---|
| 3,262,278 | 7/1966 | Thorsten | 62/20 |
| 2,933,901 | 4/1960 | Davison | 62/28 |
| 2,951,347 | 9/1960 | Spangler | 62/21 |
| 3,304,727 | 2/1967 | Roskamp | 62/21 |
| 3,024,171 | 3/1962 | Bone | 62/27 |

*Primary Examiner*—Norman Yudkoff
*Assistant Examiner*—Arthur F. Purcell
*Attorney*—Young and Quigg

[57] ABSTRACT

A method and apparatus for improved recovery of ethylene hydrocarbons in a demethanizing zone by injecting a stream of dry ethane into a gas stream discharging from a demethanizer, separating the resultant mixture into a liquid stream and a gas stream, and recycling the liquid stream as reflux to the demethanizer.

18 Claims, 2 Drawing Figures

INVENTOR.
E. L. EZELL
BY Young & Quigg
ATTORNEYS

DEMETHANIZING METHOD AND APPARATUS

In heretofore utilized methods and apparatus, significant volumes of ethylene, a valuable hydrocarbon component, were generally passed in the gaseous phase from a gas processing system and utilized as fuel or residue gas.

This invention therefore resides in providing apparatus and method for more efficiently recovering ethylene from the gaseous effluent of a demethanizer by mixing said gas with a dry ethane stream, separating the resultant mixture into a gas stream and a liquid stream, and returning said liquid stream as reflux to the demethanizer.

Other aspects, objects, and advantages of the present invention will become apparent from a study of the disclosure, the appended claims, and the drawing.

The drawings are diagrammatic views of a portion of an example hydrocarbon gas demethanizing system.

Figures 1, 2:
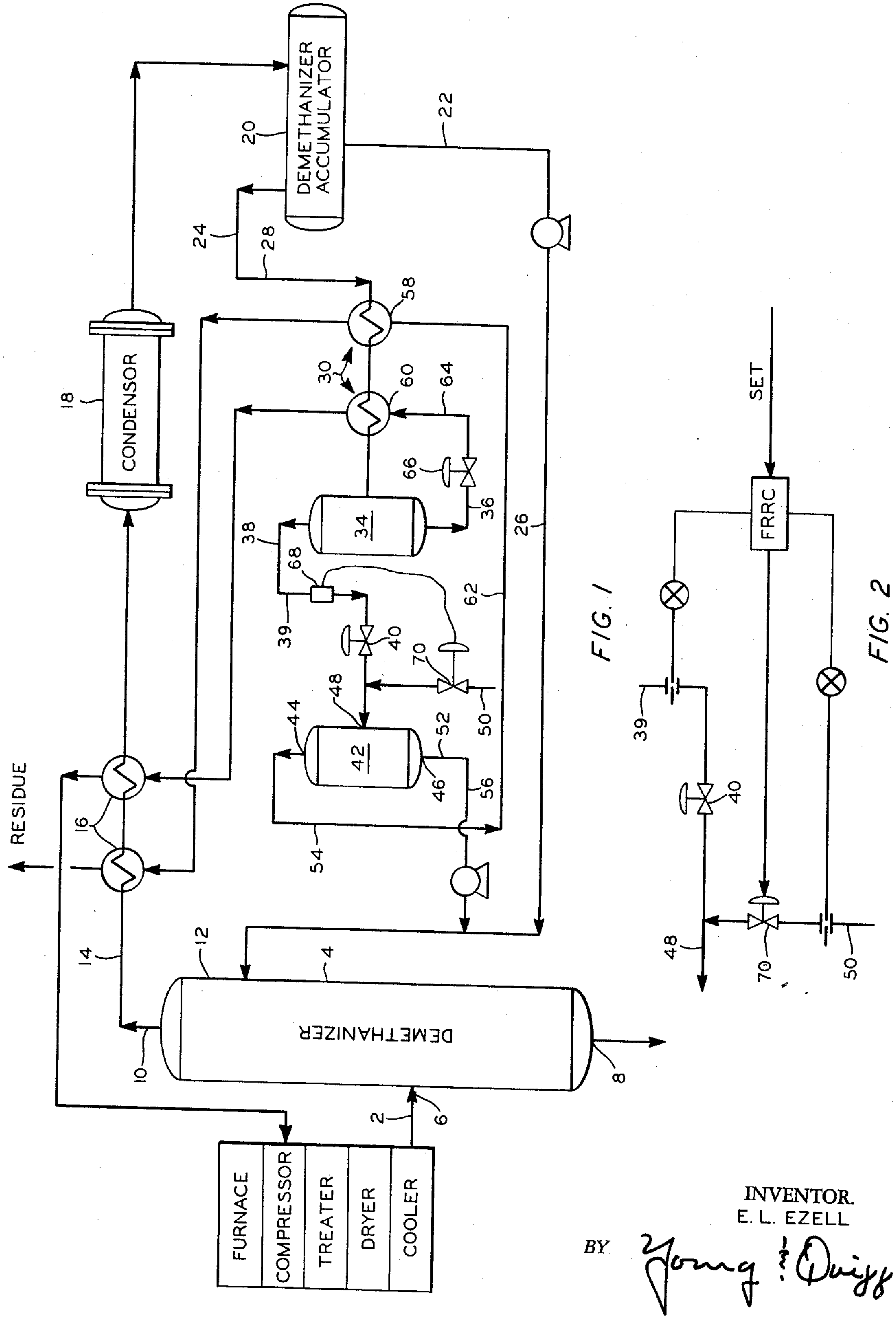
FIG. 1 shows a portion of the system.
FIG. 2 shows an example flow control means.

Referring to FIG. 1, the demethanizing zone generally receives a hydrocarbon gas feed stream 2 from other related hydrocarbon processing equipment such as, for example, furnaces, compressors, gas treaters, gas driers, and coolers. The feedstream is passed into a demethanizer 4 of the system. The demethanizer 4 has a feed inlet 6, a bottoms product outlet 8, an overhead products outlet 10 and a reflux inlet 12, as known in the art.

The feedstream from a source such as the gaseous effluent from a hydrocarbon cracking process, for example, enters the demethanizer 4. Components of the feedstream 2 are separated therewithin and discharged therefrom as a demethanizer overhead product and a bottoms product stream.

The gaseous overhead product passes via line 14 through a first cooling means 16, through a condenser 18, for example, and into a first separating means 20, here shown as a demethanizer accumulator at which location said cooled and condensed product stream is separated and discharged therefrom as a first liquid stream 22 and a first gas stream 24. The first liquid stream 22 discharging from the demethanizer accumulator 20 is passed via line 26 to the reflux inlet 12 of the demethanizer 4.

The first gas stream 24 is passed via line 28 to and through a second cooling means 30 at which location the temperature of the first gas stream is regulated.

The cooled first gas stream is thereafter passed to a first liquid knockout means 34 at which location the first gas stream 24 is separated into a second liquid stream 36 and a second gas stream 38. The second gas stream 38 passes via a first conduit means 39 from the first liquid knockout means 34, through a gas expanding means 40, such as, for example, a Joule-Thompson expansion valve, and into a second liquid knockout 42. The second liquid knockout 42 has an overhead outlet 44, a bottoms product outlet 46, and a gas stream inlet 48 which is connected to the first conduit means 39.

An injection conduit 50 is connected in fluid communication to the first conduit 39 and to a dry ethane supply (not shown) at a location downstream of the gas expanding means 40 for injecting and mixing a dry ethane stream with the expanded second gas stream 38.

In the second liquid knockout 42, the resultant gas mixture is separated into a third liquid stream 52 and a third gas stream 54. The third liquid stream 52 is discharged from the second liquid knockout 42 through the bottoms product outlet 46 and into line 56. Line 56 is connected to line 26 for recycling of the third liquid stream 52 as reflux to the demethanizer 4.

The second cooling means 30 preferably comprises first and second heat exchangers 58,60. The first heat exchanger 58 is associated with the first gas stream 24 discharging from the first separating means 20 via line 28 and the third gas stream 54 discharging from the second liquid knockout 42 via line 62. In this arrangement, the third gas stream preferably passes from the first heat exchanger to the first cooling means 16 for supplying a cooling medium thereto. The second heat exchanger 60 is connected to the first heat exchanger 58 for the passage of the first gas stream 24 therethrough and preferably to the second liquid stream 36 via line 64. In this arrangement, the second liquid stream 36 preferably passes from the second heat exchanger 60 to the first cooling means 16 for supplying a cooling medium thereto. Line 64 also preferably has a flow controlling means 66 such as an expansion valve, for example, positioned therein for controlling the flow rate of the second liquid stream 36 through the second heat exchanger 60 for regulating and controlling the temperature of the first gas stream 24 entering the first liquid knockout means 34.

The amount of ethane injected into the second gas stream 38 via line 50 is preferably controlled relative to the flow rate of the second gas stream 38. It is preferred that a flow rate sensor 68 be installed in the conduit 39 at a location upstream of the gas expanding means 40. This sensor 68 such as, for example, an orifice and flow rate controller, as known in the art, measures the flow rate of the second gas stream 38 and delivers a signal representative of that measurement. A controlling valve 70 is installed in the injection conduit 50 and connected to the flow rate sensor 68. The valve 70 receives a signal from the sensor 68, controls the rate of dry ethane injection in response to the received signal.

Referring to FIG. 2, a signal representing the flow through conduit 39 and a signal representing the flow through conduit 50 is transmitted to a flow ratio recorder controller (FRRC), for example, and as known in the art. At the flow ratio recorder controller these signals are compared one to the other and to a preselected ratio set point and a signal is delivered to the controlling valve 70 for operating said valve and maintaining the desired, preselected volume ratio of the streams flowing through conduits 39 and 50.

In the method of this invention, a hydrocarbon having one carbon atom per molecule is separated from a mixture containing hydrocarbons together with methane by fractionation in a demethanizing zone. A gas effluent stream passes from the demethanizing zone, is cooled in the first cooling means 16, condensed, and thereafter separated into a first liquid stream 22 and a first gas stream 24. The first liquid stream is passed to the reflux inlet 12 of the demethanizer for supplying reflux thereto and the first gas stream 24 is passed to the second cooling means 30 at which location its temperature is lowered.

The cooled first gas stream 24 thereafter passes into a first liquid knockout means 34 where the stream is separated into a second liquid stream 36 and a second gas stream 38 with the second gas stream being thereafter expanded as known in the art.

A stream of dry ethane is injected into and mixed with the expanded second gas stream 38 and the resultant mixture is discharged into a second liquid knockout 42 for separating said mixture into a third liquid stream 52 and a third gas stream 54. By injecting ethane into the second gas stream 38 after separating liquids therefrom and expansion thereof, the ethane mixes with the second gas stream 38. This resultant stream, owing to the presence of ethane therein, has a higher dew point relative to the dew point of the second gas stream 38 prior to mixing ethane therewith. By increasing the dew point, the ethylene component of the second gas stream 38 more readily condenses thereby providing for the recovery of volumes of ethylene that would otherwise be passed as residue gas.

The rate of injection of dry ethane into the second gas stream 38 should be relative to the flow rate of said second gas stream 38. At excessively low relative ethane injection rates, the ethylene would not be effectively scrubbed from the second stream and at excessively high rates there would be waste of power and equipment for handling the excess ethane. The ratio would depend upon the system and is a value that can be determined by one skilled in the art.

The recovered ethylene, injected ethane, and other separated liquids are thereafter recycled as reflux to the demethanizer for cooling the demethanizer and recycling the ethylene to the demethanizer for subsequent recovery thereof.

EXAMPLE I

WITHOUT ETHANE INJECTION, ONLY ONE KNOCKOUT MEANS

| Component | First Gas Stream (24) Mole/Hr. | Bottom Stream from Knockout Means Mole/Hr. | Overhead Stream from Knockout Means Mole/Hr. |
|---|---|---|---|
| Hydrogen | 871.1 | 0.4 | 870.7 |
| Methane | 1934.9 | 81.5 | 1853.4 |
| Acetylene | Nil | Nil | Nil |
| Ethylene | 173.1 | 86.0 | 87.1 |
| Ethane 2.3 | | 1.8 | 0.5 |
| Total | 2981.4 | 169.7 | 2811.7 |
| Temperature | −158°F | −193.1°F | −193.1°F |
| Pressure | 416.7 psia | 145.7 psia | 145.7 psia |

EXAMPLE II

20 MOLES PER HOUR ETHANE INJECTION (50), TWO KNOCKOUT MEANS

| Component | First Gas Stream (24) mole/hr. | Second Liquid Stream (36) mole/hr. | Third Gas Stream (54) mole/hr. | Third Liquid Stream (52) mole/hr. |
|---|---|---|---|---|
| Hydrogen | 871.1 | 1.7 | 869.3 | 0.1 |
| Methane | 1934.9 | 139.8 | 1781.6 | 13.5 |
| Acetylene | Nil | Nil | Nil | Nil |
| Ethylene | 173.1 | 87.9 | 73.6 | 11.6 |
| Ethane 2.3 | | 1.6 | 13.8 | 6.9 |
| Total | 2981.4 | 231.0 | 2738.3 | 32.1 |
| Temp. | −158°F | −158°F | −185.5°F | −185.5°F |
| Pressure (psia) | 416.7 | 416.7 | 145.7 | 145.7 |

A study of the above example will show that, by injecting 20 moles per hour ethane, the recovered ethylene volume increased from 86.0 moles per hour to 99.5 moles per hour (87.9 + 11.6 = 99.5). In this example, 13.5 moles per hour of ethylene were recovered that would normally have passed to residue disposal. This represents a significant savings of materials by avoiding the waste of the recoverable ethylene component.

Other modifications and alterations of this invention will become apparent to those skilled in the art from the foregoing discussion, example, and accompanying drawing, and it should be understood that this invention is not to be unduly limited thereto.

What is claimed is:

1. In a process for separating a hydrocarbon having 1 carbon atom per molecule from a mixture containing said hydrocarbon wherein said mixture is fractionated in a demethanizing zone with the gaseous effluent from the demethanizing zone being cooled, condensed, separated into a first liquid stream and a first gaseous stream, said first liquid stream being passed to a reflux inlet of the demethanizer, said first gas stream being passed to and cooled in a cooling zone and separated in a separating zone into a second gas stream and a second liquid stream with said second gas stream being thereafter expanded, the improvement comprising:

injecting a stream of dry ethane into the second gas stream after said second stream has been expanded;

passing the expanded resultant mixture into a second separating zone;

separating the mixture into a third gas stream and a third liquid stream; and recycling the third liquid stream into the demethanizing zone.

2. A process, as set forth in claim 1, further including measuring the flow rate of the second gas stream and controlling the flow rate of the ethane stream into the expanded second gas stream in response to the rate of flow of the second gas stream.

3. A process, as set forth in claim 1, further including passing the third gas stream to the cooling zone for cooling the first gas stream.

4. A process, as set forth in claim 1, further including passing the second liquid stream to the cooling zone for cooling the first gas stream.

5. A process, as set forth in claim 4, including regulating the flow of the second liquid stream for changing the temperature of the first gas stream passing through the cooling zone.

6. A demethanizing apparatus, comprising;

a demethanizer having a feed inlet, a bottoms product outlet, an overhead product outlet, and a reflux inlet;

a first cooling means for cooling the demethanizer overhead product;

a first separating means for separating the cooled overhead product into a first liquid stream and a first gas stream;

means for passing the resultant first liquid stream to the reflux inlet of said demethanizer;

a second cooling means for receiving and cooling the first gas stream;

a first liquid knockout means for receiving the first gas stream and separating said stream into a second liquid stream and a second gas stream;

a gas expanding means for receiving and expanding the second gas stream;

a second liquid knockout having an overhead outlet, a bottoms product outlet, and a gas stream inlet for receiving the expanded second gas stream and separating said stream into a third liquid stream and a third gas stream;

a first conduit means for passing the second gas stream from the first liquid knockout means, through the gas expanding means, and to the gas stream inlet of the second liquid knockout;

injecting means for passing a stream of dry ethane into the second gas stream at a location downstream of the gas expanding means; and means for passing the third liquid stream to the reflux inlet of said demethanizer.

7. An apparatus, as set forth in claim 6, wherein the second cooling means comprises a first heat exchanger associated with the first gas stream and with the third gas stream for receiving and cooling the first gas stream;

a second heat exchanger connected to the first heat exchanger, the gas stream inlet of the first liquid knockout, and a bottoms product outlet of the first liquid knockout for altering the temperature of the first gas stream flowing from the first separating means into the first liquid knockout means.

8. An apparatus, as set forth in claim 7, including controlling means associated with the second liquid stream flowing from the first liquid knockout means to the second heat exchanger for controlling the rate of flow of said second liquid stream and regulating the temperature change of said first gas stream passing through said second heat exchanger.

9. An apparatus, as set forth in claim 6, including a flow rate sensor associated with the first conduit means at a location upstream of said gas expanding means for measuring the flow of the second gas stream discharging from the first liquid knockout means and delivering a signal representative of said measurement;

a controlling valve in the injecting means being associated with the dry ethane stream and connected to the flow rate sensor for receiving the signal from said sensor and controlling the rate of injection of the ethane stream into the second gas stream in response to said signal.

10. An apparatus, as set forth in claim 7, including a conduit associated with the third gas stream and the first heat exchanger for passing the third gas stream to said first heat exchanger for changing the temperature of said first gas stream.

11. A process, as set forth in claim 5, including measuring the flow rate of the second gas stream and controlling the flow rate of the ethane stream into the expanded second gas stream in response to the rate of flow of the second gas stream and passing the second gas stream to the cooling zone for cooling the first gas stream.

12. An apparatus, as set forth in claim 8, including a flow rate sensor associated with the first conduit means as a location upstream of said gas expanding means for measuring the flow of the first gas stream discharging from the first liquid knockout means and delivering a signal representative of said measurement;

a conduit associated with the third gas stream and the first heat exchanger for passing the third gas stream to said first heat exchanger for changing the temperature of said first gas stream; and a controlling valve in the injecting means being associated with the dry ethane stream and connected to the flow rate sensor for receiving the signal from said sensor and controlling the rate of injection of the ethane stream into the second gas stream in response to said signal.

13. In an apparatus for separating a hydrocarbon having 1 carbon atom per molecule from a mixture containing said hydrocarbon wherein said mixture is fractionated in a demethanizing zone with the gaseous effluent from the demethanizing zone being cooled, condensed, separated into a first liquid stream and a first gaseous stream, said first liquid stream being passed to a reflux inlet of the demethanizing zone, said first gas stream being passed to and cooled in a cooling zone and separated in a separating zone into a second gas stream and a second liquid stream with said second gas stream being thereafter expanded, the improvement comprising:

means for injecting a stream of dry ethane into the second gas stream after said second stream has been expanded;

means for passing the expanded resultant mixture into a second separating zone;

means for separating the mixture into a third gas stream and a third liquid stream; and means for recycling the third liquid stream into the demethanizing zone.

14. An apparatus, as set forth in claim 13, further including means for measuring the flow rate of the second gas stream and controlling the flow rate of the ethane stream into the expanded second gas stream in response to the rate of flow of the second gas stream.

15. An apparatus, as set forth in claim 13, including means for passing the third gas stream to the cooling zone for cooling the first gas stream.

16. An apparatus, as set forth in claim 13, including means for passing the second liquid stream to the cooling zone for cooling the first gas stream.

17. An apparatus, as set forth in claim 16, including means for regulating the flow of the second liquid stream for changing the temperature of the first gas stream passing through the cooling zone.

18. An apparatus, as set forth in claim 17, including means for measuring the flow rate of the second gas stream and controlling the flow rate of the ethane stream into the expanded second gas stream in response to the rate of flow of the second gas stream; and means for passing the third gas stream to the cooling zone for cooling the first gas stream.

* * * * *